United States Patent [19]

Morozumi et al.

[11] Patent Number: 4,465,048
[45] Date of Patent: Aug. 14, 1984

[54] AIR-FUEL RATIO CONTROL SYSTEM

[75] Inventors: Takuro Morozumi, Mitaka; Mitsuo Nakamura, Tokyo; Masaaki Ohgami, Musashino; Ryuji Kataoka, Tokyo, all of Japan

[73] Assignee: Fuji Jukogyo Kabushiki Kaisha, Tokyo, Japan

[21] Appl. No.: 333,223

[22] Filed: Dec. 21, 1981

[30] Foreign Application Priority Data

Dec. 26, 1980 [JP] Japan .................................. 55-189096

[51] Int. Cl.$^3$ .............................................. F02M 7/24
[52] U.S. Cl. ..................................... 123/440; 123/438
[58] Field of Search ............... 123/440, 438, 589, 585, 123/489

[56] References Cited

U.S. PATENT DOCUMENTS 3,931,814  1/1976  Rivere .................................. 123/438
4,048,479  9/1977  Rivere .................................. 123/489
4,363,305 12/1982  Ohgami et al. ..................... 123/440

FOREIGN PATENT DOCUMENTS 2612120 10/1976 Fed. Rep. of Germany ...... 123/440
1445849  8/1976 United Kingdom ............... 123/438

Primary Examiner—Andrew M. Dolinar
Attorney, Agent, or Firm—Martin A. Farber

[57] ABSTRACT

An air-fuel ratio control system for an internal combustion engine comprises an induction passage, a carburetor, an on-off type electromagnetic valve for correcting the air-fuel ratio of the air-fuel mixture supplied to the carburetor, an $O_2$-sensor for detecting oxygen concentration of exhaust gases, and a feedback control circuit responsive to the output of the $O_2$-sensor for producing pulses for driving said electromagnetic valve for correcting the air-fuel ratio.

An engine speed detecting circuit is provided for producing an output signal which varies with the engine speed; and a frequency changing circuit is provided to be responsive to the output signal of the engine speed detecting for changing the frequency of the pulses whereby the electromagnetic valve may be prevented from resonating with the vibration of the engine and with the pulsations of induced air.

17 Claims, 4 Drawing Figures

AIR-FUEL RATIO CONTROL SYSTEM

BACKGROUND OF THE INVENTION

The present invention relates to an air-fuel ratio control system for an internal combustion engine for vehicles, which controls the air-fuel ratio of the air-fuel mixture to a value approximately equal to the stoichiometric air-fuel ratio at which a three-way catalyst acts most effectively, and more particularly to an air-fuel ratio control system which is capable of preventing an air-fuel ratio adjusting electromagnetic valve from resonating with the vibration of the engine and with the pulsations of induced air.

In a conventional air-fuel ratio control system, the air-fuel ratio of the air-fuel mixture burned in the cylinders of engine is detected as an oxygen concentration of the exhaust gases by means of an $O_2$-sensor provided in the exhaust passage of the engine, and a comparator compares the output signal from the $O_2$-sensor with a reference value and produces an output representing whether the signal is greater or smaller than the reference value corresponding to the stoichiometric air-fuel ratio. An electromagnetic valve is operated in dependency on the output for regulating the air to be mixed with the mixture to provide the stoichiometric air-fuel ratio.

The output of the comparator is applied to an integrating circuit which produces an output increasing or decreasing in accordance with the integration of the input. The output of the integrating circuit is applied to a comparator where the output is compared with a triangular pulse train applied from a triangular pulse generator for producing square pulses. The duty ratio of the square pulses varies in accordance with the output of the integrating circuit. The square wave pulses are applied to an on-off type electromagnetic valve. Thus, the electromagnetic valve is opened and closed at duty ratios dependent on the applied square pulses for controlling the air to be supplied to the carburetor of the engine to provide the air-fuel mixture at the stoichiometric air-fuel ratio.

The electromagnetic valve is driven at the frequency of the square pulses which corresponds to the frequency of the triangular pulses. It is advantageous for improving the resonance of the air-fuel ratio control system to drive the electromagnetic valve at a high frequency. However, since the high frequency driving of the electromagnetic valve causes a short life time of the valve, the valve is driven at a relatively low constant frequency, in practice.

On the other hand, there is necessarily an operating condition in which vibration of the electromagnetic valve body caused by its own operation coincides with the vibration caused by the engine body and/or with the vibration caused by pulsations of induced air, that is resonance of the electromagnetic valve occurs. When the electromagnetic valve resonates, the air-fuel ratio fluctuates greatly, which will impair the driveability of the vehicle.

SUMMARY OF THE INVENTION

The object of the present invention is to provide an air-fuel ratio control system in which the electromagnetic valve is driven at a frequency which is changed depending on engine speed, whereby resonance of the electromagnetic valve may be prevented.

According to the present invention, there is provided an air-fuel ratio control system for an internal combustion engine having an ignition device, an induction passage, a carburetor, an on-off type electromagnetic valve for correcting the air-fuel ratio of the air-fuel mixture supplied to said carburetor, an $O_2$-sensor for detecting oxygen concentration of exhaust gases, and a feedback control circuit responsive to the output of said $O_2$-sensor for producing pulses for driving said electromagnetic valve for correcting the air-fuel ratio; having an improvement comprising an engine speed detecting circuit for producing an output signal which varies with the engine speed; and a frequency changing circuit responsive to said output signal of said engine speed detecting for changing the frequency of said pulses for the drive of said electromagnetic valve so as to prevent resonance of vibration of the electromagnetic valve caused by operation of the electromagnetic valve with vibrations caused by other operations of the vehicle.

The other objects and features are explained more in detail with reference to the accompanying drawings.

DETAILED DESCRIPTION OF THE PREFERRED EMBODIMENTS

Figure 1:
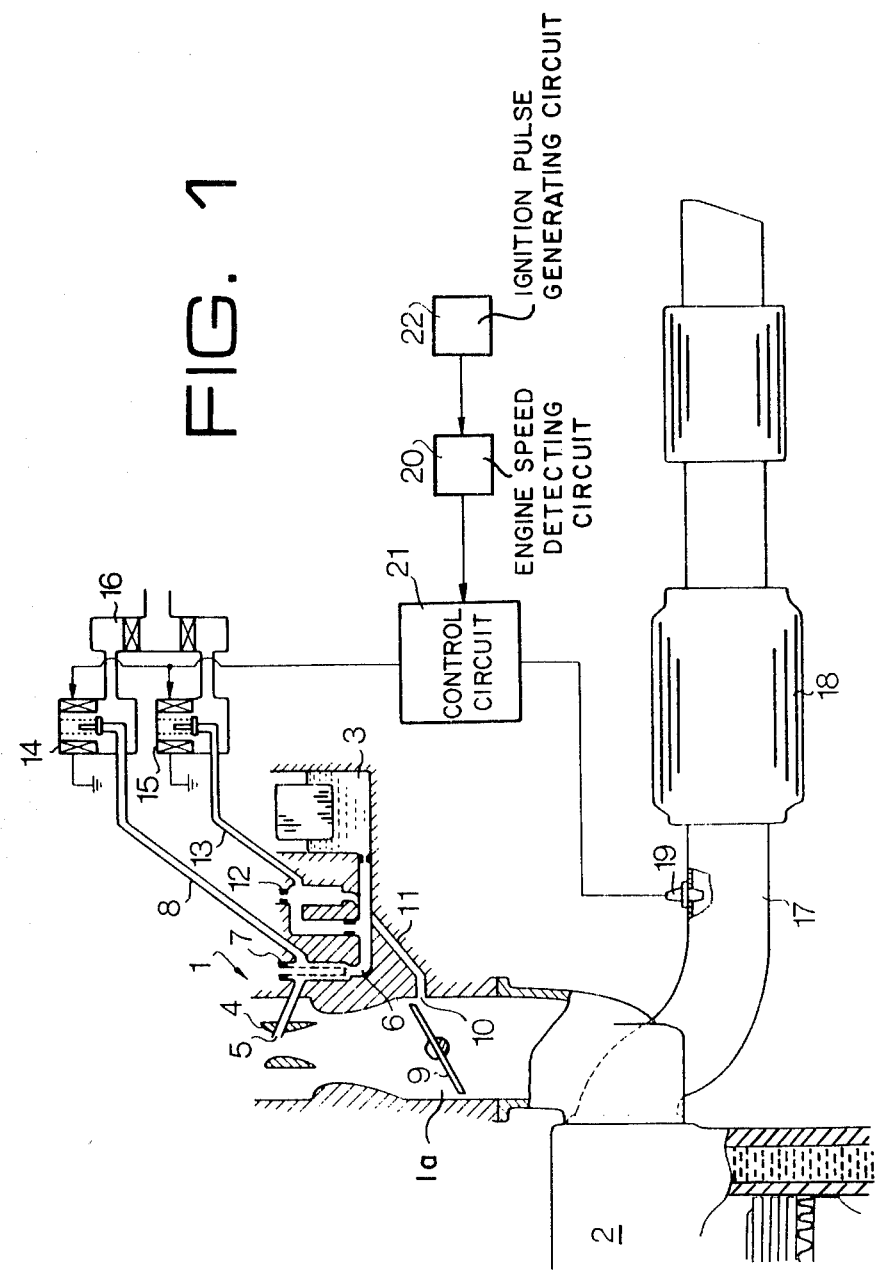
FIG. 1 is a schematic view of an air-fuel ratio control system according to an embodiment of the present invention.

Referring to FIG. 1 showing schematically the air-fuel ratio control system according to an embodiment of the present invention, reference numeral 1 designates a carburetor provided upstream of an engine 2. The carburetor 1 comprises a float chamber 3, a main nozzle 5 of a venturi 4, and a correcting air passage 8 communicating with an air-bleed 7 which is provided in a main fuel passage 6 between the float chamber 3 and the nozzle 5. Another correcting air passage 13 communicates with another air-bleed 12 which is provided in a slow fuel passage 11 which diverges from the main fuel passage 6 and extends to a slow port 10 opening in the vicinity of a throttle valve 9 in the induction passage 1a. These correction air passages 8 and 13 communicate with respective electromagnetic valves 14, 15, induction sides of which communicate with the atmosphere through an air cleaner 16. Further, a catalytic converter 18 with three-way catalyst is provided in an exhaust pipe 17 at the downstream side of the engine, and an $O_2$-sensor 19 is provided between the engine 2 and the converter 18 to detect the oxygen concentration of the exhaust gases as the air-fuel ratio of the mixture burned in the cylinder of the engine.

A control circuit 21 is applied with the output from the $O_2$ sensor 19, to actuate the electromagnetic valves 14, 15 to open and close at a certain duty ratio according to the output signal. The air-fuel ratio is made lean by supplying correction air to the carburetor at a large feed rate and the air-fuel ratio is made rich by reducing the correction air supply.

An engine ignition pulse generating circuit 22 is connected to an engine speed detecting circuit 20 which operates to convert the engine speed to an electric signal. The output of the circuit 20 is also connected to the control circuit 21.

Figure 2:
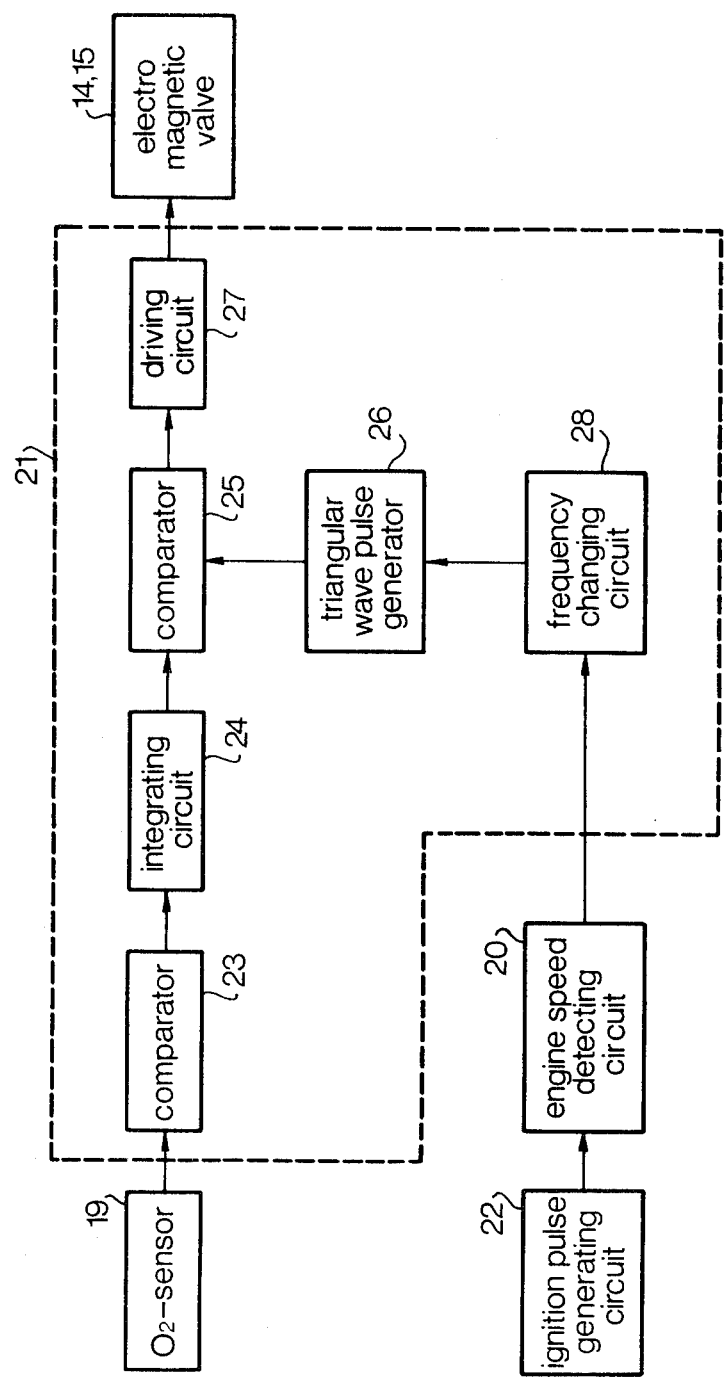
FIG. 2 is a block diagram of the control system of the same.

Referring to FIG. 2 which is a block diagram showing the control system of the present invention, the output of the O$_2$-sensor 19 is applied to an integrating circuit 24 through a comparator 23. The output of the integrating circuit 24 is applied to a comparator 25; and a triangular wave signal from a triangular pulse generator 26 is applied to the comparator 25 to produce square wave pulses. A driving circuit 27 is applied with the square wave pulses from the comparator 25 to drive the electromagnetic valves 14, 15. On the other hand, the output of the engine speed detecting circuit 20 is connected to a frequency changing circuit 28, which in turn is connected to the triangular pulse generator 26.

Figure 3:
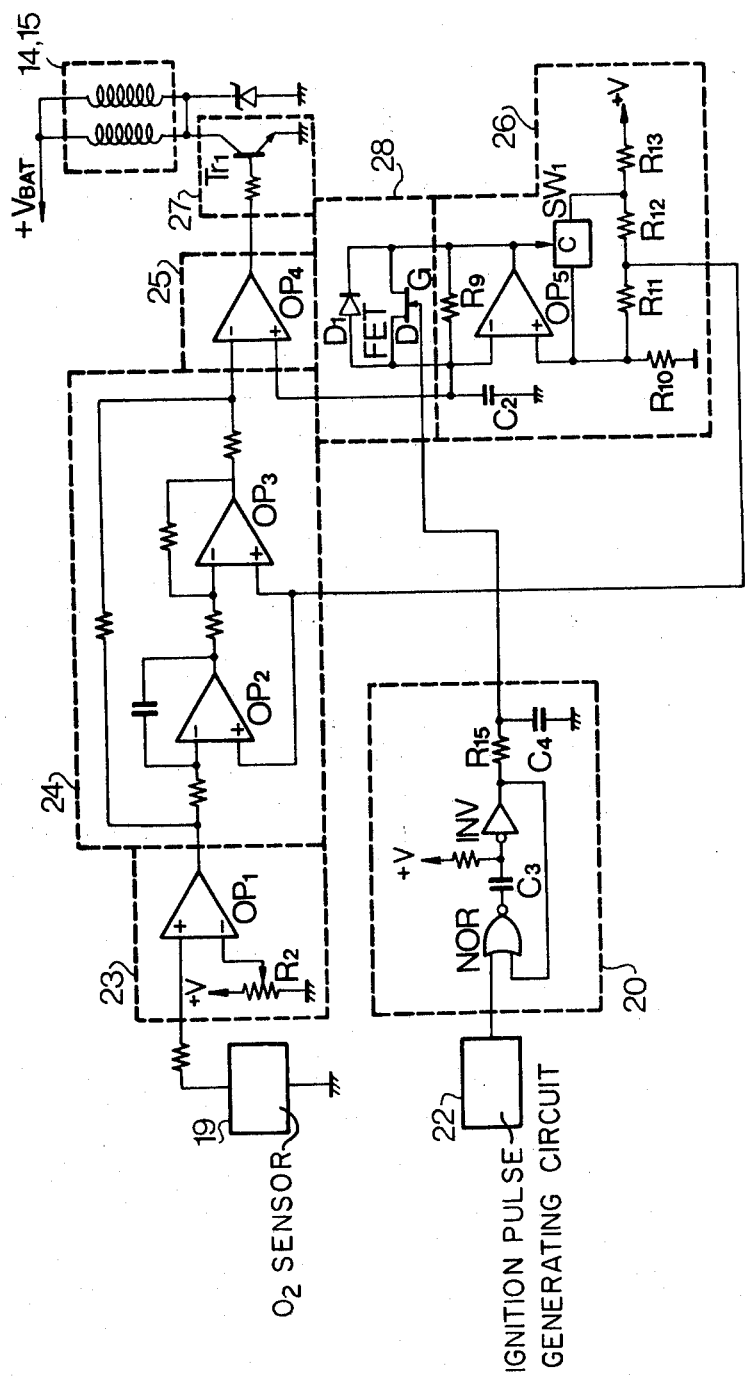
FIG. 3 is an electric circuit of an embodiment of the present invention.

In operation, the output signal of the O$_2$-sensor 19 is applied to the comparator 23, where the output signal of the O$_2$-sensor 19 is compared with a standard signal which is set by a variable resistor $R_2$ (FIG. 3) so as to correspond to the stoichiometric air-fuel ratio for comparing the air-fuel ratio of the mixture. The output of the comparator 23 is applied to the integrating circuit 24 which produces a proportional and integrated output. The output is compared with the triangular pulse train from triangular pulse generator 26 in the comparator 25 to produce square wave pulses, the duty ratio of which varies with the proportional and integrated output of the integrating circuit 24. The frequency of the square wave pulses is determined by the frequency of the triangular pulse train. The square wave pulses are sent to the electromagnetic valves 14, 15 through a driving circuit 27. The electromagnetic valves 14, 15 are driven at the duty ratios of the square pulses. Thus the air-fuel ratio of the mixture is controlled to the stoichiometric air-fuel ratio.

On the other hand, the ignition pulse generating circuit 22 produces pulses varying in proportion to the engine speed. The pulses are applied to the engine speed detecting circuit 20 comprising a monostable multivibrator which produces an output proportional to the engine speed. The engine speed detecting circuit 20 comprises a NOR gate, an inverter INV and a capacitor $C_3$, which form a monostable multivibrator, and further comprises an integrating circuit comprising a resistor $R_{15}$ and a capacitor $C_4$. Thus, the circuit 20 produces an output, the voltage of which varies in proportion to the engine speed. The output voltage is applied to a gate of a semiconductor device, namely a FET of the frequency changing circuit 28, so that the current passing between the drain and the source of the FET varies with the output voltage.

In the triangular pulse generating circuit 26, the potential of a capacitor $C_2$ is zero at the start of the engine. Since the output of an operational amplifier (opamp) OP$_5$ is at a high level, an analog switch SW$_1$ is turned on and a high voltage set by resistors $R_{10}$ and $R_{13}$ is applied to the positive input of the opamp OP$_5$. The output of the opamp OP$_5$ is applied to the capacitor $C_2$ through a resistor $R_9$ and the FET. When the voltage at the capacitor $C_2$ reaches a high level, the output of the opamp OP$_5$ is inverted to a low level, turning off the analog switch SW$_1$. As a result, a low voltage by resistors $R_{10}$ to $R_{13}$ is applied to the positive input of the opamp OP$_5$ and the voltage at the capacitor $C_2$ rapidly decreases by discharging through a diode $D_1$.

The above described operation is repeated so that the voltage at the capacitor $C_2$ varies in triangular wave form. Thus, the circuit 26 produces a triangular pulse train at a frequency. The frequency is determined by the capacitance of the capacitor $C_2$ and the current passing through the FET when charging the capacitor $C_2$. The current passing through the FET increases with the increase of the output voltage of the engine speed detecting circuit 20. Thus, the frequency of the triangular pulse train increases with the increase of the engine speed.

The resonance occurs when the engine speed is equal to an integer multiple of the frequency. Accordingly, when the frequency of the triangular pulse train is 20 Hz, the resonance occurs at engine speeds of 1200, 2400 and 3600 rpm. Therefore, if the frequency of the triangular pulse train is varied so as not to coincide with the engine speed in an integer multiple, resonance of the electromagnetic valve may be prevented. In the system, the frequency of the triangular pulse train is varied by varying the resistance of the FET so that resonance of the electromagnetic valve does not occur.

Figure 4:
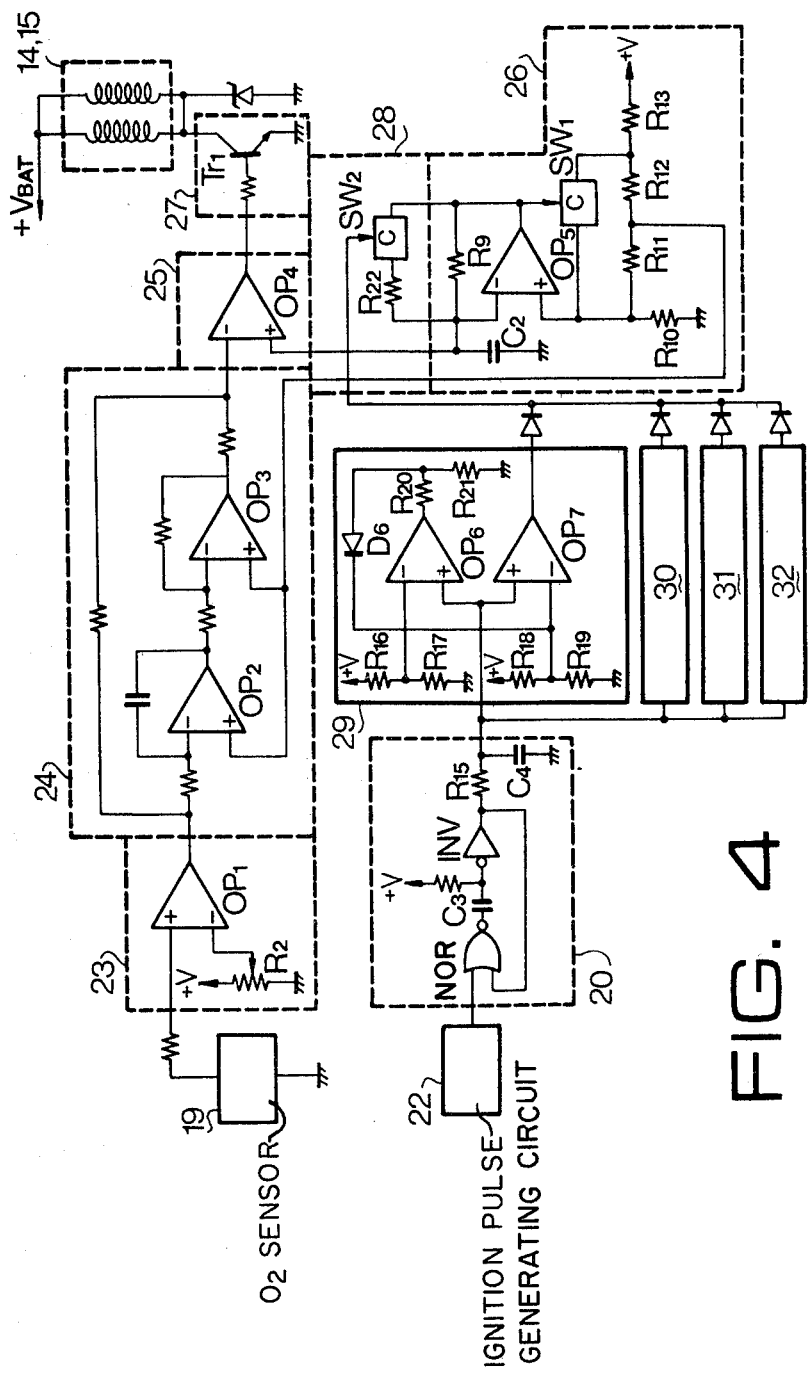
FIG. 4 is an electric circuit showing another embodiment of the present invention.

Referring to FIG. 4 showing another embodiment of the present invention, the circuit is provided with four wind comparators 29, 30, 31 and 32 between the engine speed detecting circuit 20 and the frequency changing circuit 28. The wind comparator comprises a pair of opamps OP$_6$ and OP$_7$, resistors $R_{16}$ to $R_{21}$ and a diode $D_6$. The wind comparator is so arranged that its output changes to a high level when the input voltage thereto exceeds a predetermined voltage. The wind comparators 29 to 32 are different in set input voltage for the occurrence of an output inversion. Each set input voltage is selected to a value corresponding to an engine speed which would cause the resonance of the electromagnetic valve.

When the output of the engine speed detecting circuit 20 coincides with one of the set input voltages, the corresponding wind comparator produces a high level voltage which is applied to an analog switch SW$_2$ to turn it on. Thus, the resistance serving to change the frequency changes from the resistance of the resistor $R_9$ to a composite resistance of resistors $R_9$ and $R_{22}$. Accordingly, the frequency of the triangular pulse train increases to prevent resonance.

Although the above described systems are constructed by analogue devices, the system may also be composed by a digital circuit using microcomputers.

In accordance with the present invention, resonance of the electromagnetic valve is prevented and fluctuation of the air-fuel ratio of the mixture may be reduced to prevent the impairment of driveability of the vehicle.

What is claimed is:

1. In an air-fuel ratio control system for an internal combustion engine with an ignition device, an induction passage, a carburetor communicating with the induction passage, an on-off type electromagnetic valve for correcting the air-fuel ratio of air-fuel mixture supplied to said carburetor, an O$_2$ sensor for detecting oxygen concentration of exhaust gases from the engine, and a feedback control circuit responsive to the output of said O$_2$ sensor for producing driving pulses to drive said electromagnetic valve for correcting the air-fuel ratio, said feedback control circuit including an integrating circuit, a triangular pulse train generating circuit for producing a triangular pulse train, a comparator for producing square pulses by comparing the output of the integrating circuit with the triangular pulse train, and a driving circuit for producing said driving pulses from said square pulses, the improvement comprising an engine speed detecting circuit means for producing an output signal varying in proportion to the engine speed; and a frequency changing circuit means electrically connected to said feedback control circuit and to said engine speed detecting circuit means for changing the frequency of said driving pulses for the drive of said electromagnetic valve so as to prevent resonance of vibration of the electromagnetic valve caused by operation of the electromagnetic valve with vibration caused by other influences thereon including operations of the engine.

2. The air-fuel ratio control system for an internal combustion engine according to claim 1, wherein said frequency changing circuit means is connected to said triangular pulse train generating circuit and includes a semiconductor device having a resistance which varies with an input applied thereto from said engine speed detecting circuit means, and the semiconductor device constitutes an operative portion of said triangular pulse train generating circuit, such that variation of the resistance causes the frequency changing of the triangular pulse train, thereby changing the frequency of said driving pulses.

3. The air-fuel ratio control system for an internal combustion engine according to claim 2, wherein said frequency changing circuit means includes a diode, said semiconductor device is a FET connected in parallel to said diode.

4. The air-fuel ratio control system for an internal combustion engine according to claim 3, wherein said triangular pulse train generating circuit comprises a plurality of resistors connected between ground and a voltage source, an operational amplifier having a positive input and a negative input, a resistor connected across the output of said operational amplifier and said negative input, a grounded capacitor connected at one plate thereof to said negative input and to said comparator, and an analog switch connected between said resistors and said positive input and having a gate connected to the output of said operational amplifier, said FET and said diode are connected across the output of said operational amplifier and said one plate of said capacitor, said diode being connected in a conduction direction toward the output of said operational amplifier.

5. The air-fuel ratio control system for an internal combustion engine according to claim 4, wherein said engine speed detecting circuit means comprises a monostable multivibrator and an integrator connected to the output of said monostable multivibrator.

6. The air-fuel ratio control system for an internal combustion engine according to claim 2, wherein said semiconductor device is such that said resistance varies with respect to said engine speed such that the latter is other than integer multiple of said frequency of said driving pulses.

7. The air-fuel ratio control system for an internal combustion engine according to claim 4, wherein said semiconductor device is such that said resistance varies with respect to said engine speed such that the latter is other than an integer multiple of said frequency of said driving pulses.

8. The air-fuel ratio control system for an internal combustion engine according to claim 2, wherein said semiconductor device is a FET.

9. The air-fuel ratio control system for an internal combustion engine according to claim 2, wherein said frequency changing circuit means includes a diode, said semiconductor device is a FET connected in parallel to said diode and to an operational amplifier of said triangular pulse generating circuit.

10. The air-fuel ratio control system for an internal combustion engine according to claim 1, wherein said frequency changing circuit means is for changing the frequency of said driving pulses such that the engine speed is other than an integer multiple of said frequency of said driving pulses.

11. The air-fuel ratio control system for an internal combustion engine according to claim 1, further comprising a plurality of wind comparator means in parallel connected between said engine speed detecting circuit means and said frequency changing circuit means for actuating said frequency changing circuit means when the output signal of said engine speed detecting circuit means reaches predetermined values, respectively.

12. The air-fuel ratio control system for an internal combustion engine according to claim 11, wherein said triangular pulse train generating circuit produces said triangular pulse train with a fixed frequency, said frequency changing circuit means is for changing the frequency of said driving pulses by changing said fixed frequency of said triangular pulse train when said frequency changing circuit means is actuated such that the engine speed is other than an integer multiple of said frequency of said driving pulses.

13. The air-fuel ratio control system for an internal combustion engine according to claim 12, wherein said frequency changing circuit means comprises a resistor and a switch connected thereto, said switch has a gate connected to outputs of said wind comparator means for actuation of said switch and of said frequency changing circuit means, said resistor being operatively connected to said triangular pulse train generating circuit upon actuation of said switch such that said fixed frequency of said triangular pulse train is changed to another fixed frequency dependent on said resistor, whereby said engine speed at the time is other than any integer multiple of said another fixed frequency.

14. The air-fuel ratio control system for an internal combustion engine according to claim 13, wherein each said wind comparator means comprises two operational amplifiers having connected positive inputs constituting an input of said wind comparator means and negative inputs, voltage divider resistors are connected to said negative inputs, respectively, and a grounded resistor pair is connected to the output of one of said operational amplifiers, a first diode is connected from between said resistor pair in a conducting direction to the negative input of said other operational amplifier, the output of the latter constituting the output of said wind comparator means, second diodes connect the output of said wind comparator means to the gate of said switch, respectively.

15. The air-fuel ratio control system for an internal combustion engine according to claim 1, wherein
said engine speed detecting circuit means is connected to said ignition device.

16. An air-fuel ratio control system for an internal combustion engine comprising
an induction passage,
a carburetor communicating with the induction passage,
an on-off type electromagnetic valve for correcting the air-fuel ratio of air-fuel mixture supplied to said carburetor,
an $O_2$ sensor for detecting oxygen concentration of exhaust gases from the engine, and
a feedback control circuit responsive to the output of said $O_2$ sensor for producing driving pulses to drive said electromagnetic valve for correcting the air-fuel ratio,
means for changing the frequency of said driving pulses such that the engine speed is other than an integer multiple of said frequency of said driving pulses.

17. An air-fuel ratio control system for an internal combustion engine comprising
an induction passage,
a carburetor communicating with the induction passage,
an on-off type electromagnetic valve for correcting the air-fuel ratio of air-fuel mixture supplied to said carburetor,
an $O_2$ sensor for detecting oxygen concentration of exhaust gases from the engine, and
a feedback control circuit responsive to the output of said $O_2$ sensor for producing driving pulses to drive said electromagnetic valve for correcting the air-fuel ratio,
means for changing the frequency of said driving pulses so as to prevent resonance of vibration of the electromagnetic valve caused by operation of the electromagnetic valve with vibrations caused by other influences thereon including operations of the engine.

* * * * *